(12) United States Patent
Kobayashi et al.

(10) Patent No.: US 7,851,953 B2
(45) Date of Patent: Dec. 14, 2010

(54) GENERATOR FOR VEHICLE

(75) Inventors: Naoki Kobayashi, Wako (JP); Kazumi Shibata, Wako (JP); Kuniaki Ikui, Wako (JP); Tomohiro Tsukamoto, Wako (JP); Koji Aoki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 261 days.

(21) Appl. No.: 12/237,195

(22) Filed: Sep. 24, 2008

(65) Prior Publication Data

US 2009/0085418 A1 Apr. 2, 2009

(30) Foreign Application Priority Data

Sep. 27, 2007 (JP) ............................. 2007-251503

(51) Int. Cl.
*H02K 9/14* (2006.01)
(52) U.S. Cl. ...................................... 310/68 D; 310/66
(58) Field of Classification Search ............... 310/68 D, 310/66
See application file for complete search history.

(56) References Cited

U.S. PATENT DOCUMENTS

2006/0087181 A1* 4/2006 Kusumi .................... 310/68 D

FOREIGN PATENT DOCUMENTS

| JP | 2001-286100 A | 10/2001 |
|----|---------------|---------|
| JP | 2001286100 A *| 10/2001 |
| JP | 2002-112594 A | 4/2002  |

OTHER PUBLICATIONS

JPO website machine translation of JP 2001286100 A-, Oct. 2001, Yamamoto et al., IC Engine Generator, All.*

* cited by examiner

*Primary Examiner*—Quyen Leung
*Assistant Examiner*—Naishadh N Desai
(74) *Attorney, Agent, or Firm*—Birch, Stewart, Kolasch & Birch, LLP

(57) ABSTRACT

A generator has a rotor boss engaged with a crankshaft with a rotor core engaged with the outer circumference of the rotor boss. A stator core is provided around the outer circumference of the rotor core with a bus ring opposed to one end surface of the rotor core. The outer circumference of the bus ring is engaged with a plurality of insulating components surrounding the teeth. The stator core has a split structure composed of a plurality of stator core blocks connected together. Each stator core block is fixed to a generator cover by a bolt. The generator cover is fixed to the outer surface of a crankcase. The rotor core is formed with a plurality of holes for respectively supporting a plurality of rotor magnets. The bus ring includes a plurality of terminals and grommets connected through bus bars to the terminals.

20 Claims, 5 Drawing Sheets

GENERATOR FOR VEHICLE

CROSS-REFERENCE TO RELATED APPLICATIONS

The present application claims priority under 35 USC 119 to Japanese Patent Application No. 2007-251503 filed on Sep. 27, 2007 the entire contents of which are hereby incorporated by reference.

FIELD OF THE INVENTION

The present invention relates to a generator for a vehicle, and more particularly to a generator for a vehicle in which the inside space of a generator cover can be effectively used to thereby reduce the size of the generator.

DESCRIPTION OF BACKGROUND ART

An engine driven generator for a vehicle is known wherein a generator includes an outer rotor with permanent magnets serving also as a flywheel that are mounted on a crankshaft as an output shaft of an engine. An inner stator includes windings mounted on a generator cover. See, for example, Japanese Patent Laid-open Nos. 2002-112594 and 2001-286100.

In the generator described in Japanese Patent Laid-open Nos. 2002-112594 and 2001-286100, a relatively large space is necessary between the outer circumference of the outer rotor directly connected to the crankshaft and the inner circumferential surface of the generator cover. This space causes an increase in the size of the generator cover. More particularly in a motorcycle, the generator cover is located so as to project laterally from a vehicle body in many cases. Accordingly, when the size of the generator cover is large, it is difficult to obtain a large bank angle.

In a conventional brushless generator, a control circuit for switching is generally provided independently of the generator. It is therefore desirable to integrate this control circuit with the generator.

SUMMARY AND OBJECTS OF THE INVENTION

It is accordingly an object of an embodiment of the present invention to provide a generator for a vehicle in which the components and control circuit of the generator can be efficiently accommodated in a generator cover.

In accordance an embodiment of the present invention, there is provided a generator for a vehicle having an engine with the generator being driven by the engine. The generator includes a rotor boss engaged with one end of a crankshaft of the engine with a rotor core having an inner circumference engaged with the outer circumference of the rotor boss. The rotor core has a plurality of rotor magnets arranged along the outer circumference of the rotor core with an annular stator core having an inner circumference opposed to the outer circumference of the rotor core. A plurality of insulating components are respectively surrounding a plurality of teeth of the stator core with a plurality of stator windings respectively wound around the plurality of insulating components. A bus ring is opposed to one end surface of the rotor core opposite to the engine with the bus ring having an outer circumference engaged with the insulating components. A generator cover is mounted on a crankcase of the engine. A rotational angle sensor is provided for detecting a rotational angle of the rotor boss. A sensor magnet is provided on one end of the rotor boss so as to be opposed to the rotational angle sensor. A generated voltage control driver is mounted on the bus ring with the stator core being held to the generator cover.

In accordance with an embodiment of the present invention, the rotor core has a plurality of rotor magnet support holes formed in the vicinity of and arranged along the outer circumference of the rotor core so as to extend in the axial direction of the rotor boss from one end surface to the other end surface of the rotor core. The plurality of rotor magnets are respectively fitted in the plurality of rotor magnet support holes.

In accordance with an embodiment of the present invention, the stator core is composed of a plurality of stator core blocks connected together so as to form an annular shape.

In accordance with an embodiment of the present invention, the bus ring is a disk-shaped member. The bus ring includes a plurality of terminals formed along the outer circumference of the bus ring for connecting the plurality of stator windings at their opposite ends. A grommet is provided for fixing a harness for drawing out a current generated in the stator windings with a bus bar for connecting the terminals to the grommet.

In accordance with an embodiment of the present invention, a gear is mounted on the other end of the rotor boss opposed to the engine to transmit a driving force from an external starter motor through a one-way clutch to the rotor boss.

In accordance with an embodiment of the present invention, the rotational angle sensor is held to the bus ring.

In accordance with an embodiment of the present invention, the rotational angle sensor is mounted on a boss formed on the inner surface of the generator cover with the boss extending through the bus ring to the rotor boss.

According to an embodiment of the present invention, the rotor boss is fixed to the crankshaft, and the rotor core is mounted on the outer circumference of the rotor boss, thus forming an inner rotor. Further, the stator core (outer stator) is provided around the outer circumference of the rotor core. With this structure, the outer circumference of the stator core can be set in close contact with the inner surface of the generator cover. Accordingly, the radial size of the generator cover in the radial direction from the center of rotation of the rotor core can be reduced to thereby reduce the size of the generator. Further, the stator is mounted to the generator cover. Accordingly, since the generator cover is cooled by a flow of air, a cooling of the stator occurs by the flow of air. Further, the control driver is mounted on the bus ring. Accordingly, the line of a control system for controlling the output from the stator windings can be shortened. Further, all the components of the generator including not only the main components, but also the control driver mounted on the bus ring are accommodated in the cover. Accordingly, the compatibility in wiring or between generators can be ensured.

The rotor core is mounted through the rotor boss to the crankshaft. Accordingly, by adapting the shape of the rotor boss to the shape of the crankshaft, the generator of the present invention can be mounted to various kinds of engines, thus increasing the versatility.

According to an embodiment of the present invention, the rotor magnet support holes can be easily formed by a forming step (punching step) for the material of the rotor core. Further, the rotor magnets can be easily mounted to the rotor core by simply inserting the rotor magnets into the rotor magnet support holes.

According to an embodiment of the present invention, the stator core is formed by connecting a plurality of stator core blocks. Accordingly, as compared with the case that the stator core has an integral structure, the yield of the material can be improved. Further, the space factor of the windings can also be improved.

According to an embodiment of the present invention, the stator windings can be connected through the bus bar to the grommet. Accordingly, by connecting the harness to the grommet, the generated power can be easily supplied to the outside of the generator, thus facilitating the wiring.

According to an embodiment of the present invention, the engine and the generator can be easily started by connecting the external starter motor to the gear According to an embodiment of the present invention, the sensor for detecting the rotational angle of the rotor core can be easily opposed to the sensor magnet mounted on the rotor boss.

According to an embodiment of the present invention, the rotational angle sensor is mounted on the generator cover so as to be opposed through the bus ring to the sensor magnet. Accordingly, by removing the generator cover, the rotational angle sensor can be easily taken out of the generator, thus improving the maintainability.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
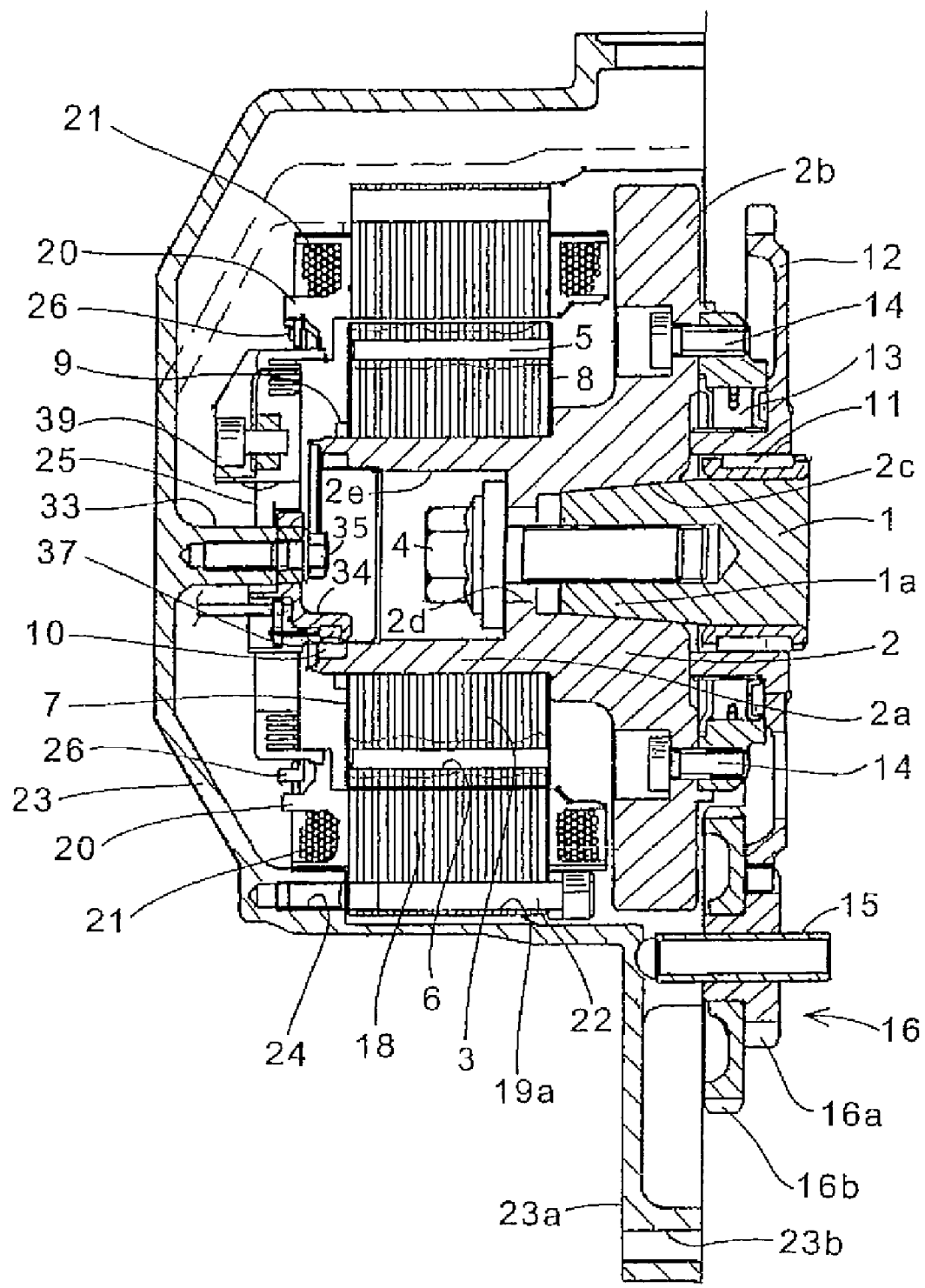
FIG. 1 is a sectional view of a generator for a vehicle according to a preferred embodiment of the present invention.
Figure 2:
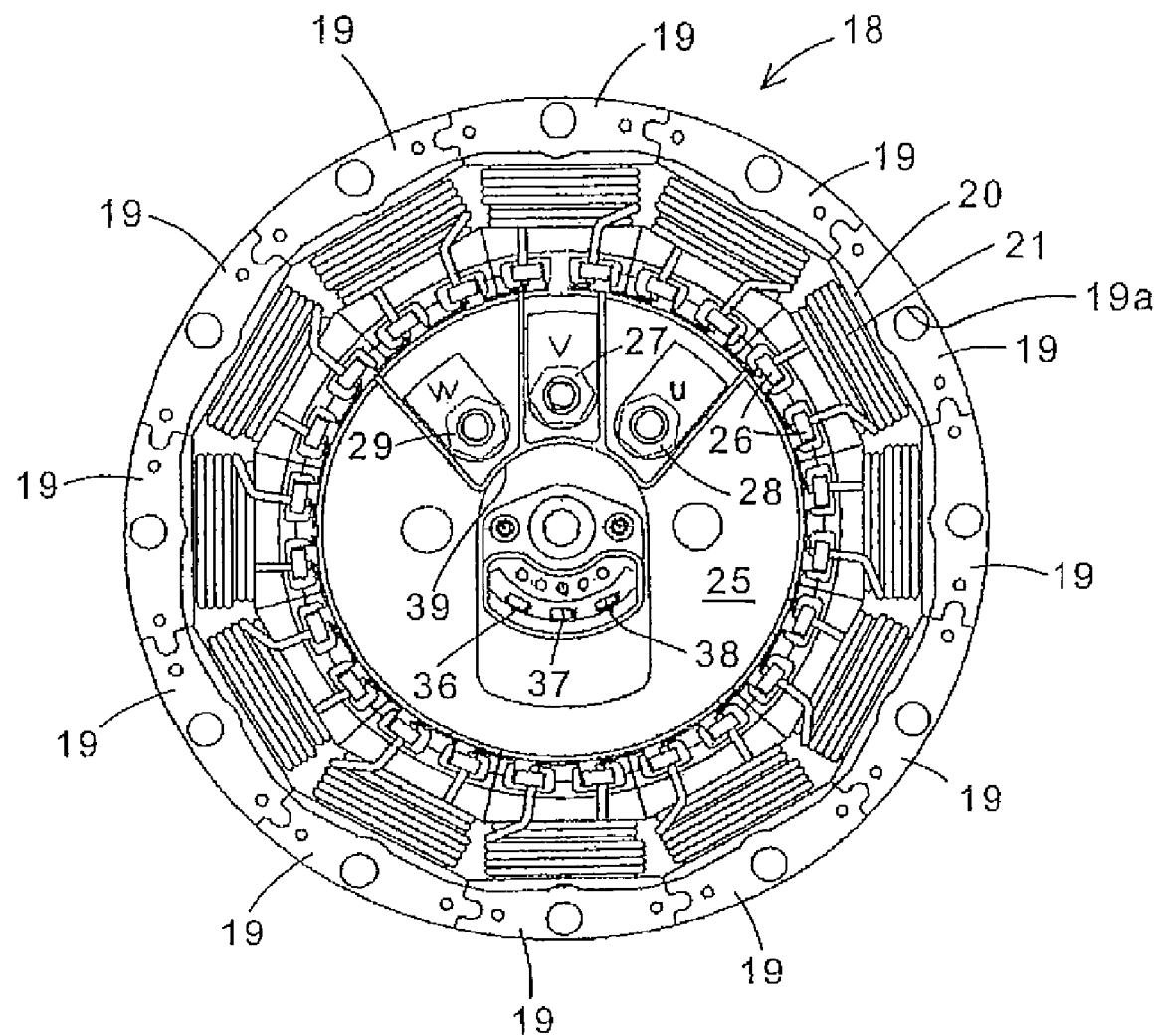
FIG. 2 is an elevational view of a stator unit of the generator for a vehicle according to a preferred embodiment of the present invention.

A preferred embodiment of the present invention will now be described with reference to the drawings. FIG. 1 is a sectional view of a generator for a vehicle according to a preferred embodiment of the present invention, and FIG. 2 is an elevational view of the generator for a vehicle in the condition where a generator cover is removed, i.e., an elevational view of a stator unit of the generator.

As shown in FIG. 1, a crankshaft 1 of an engine is, for example, mounted on a motorcycle. The crankshaft 1 has a front end portion 1a whose outer circumferential surface is tapered. The front end portion 1a of the crankshaft 1 is fitted in a central hole of a rotor boss 2. The rotor boss 2 is composed of a cylindrical portion 2a and a flange 2b formed at one end of the cylindrical portion 2a. A rotor core 3 is mounted on the outer circumference of the cylindrical portion 2a of the rotor boss 2. The cylindrical portion 2a includes a tapering inner circumferential surface 2c fitted to the tapering outer circumferential surface of the front end portion 1a of the crankshaft 1 with a bolt head seating wall 2d being formed at a smaller-diameter end of the tapering inner circumferential surface 2c, and a recess 2e for accommodating the head of a bolt 4. The rotor boss 2 is fixed to the front end portion 1a of the crankshaft 1 by means of the bolt 4 which is inserted through a central hole of the recess 2e and the bolt head seating wall 2d.

The rotor core 3 is mounted on the outer circumferential surface of the cylindrical portion 2a of the rotor boss 2, and a plurality of rotor magnets 5 are mounted in the rotor core 3 at radial positions near the outer circumferential surface of the rotor core 3. In this preferred embodiment, sixteen rotor magnets 5 forming eight pairs are arranged in the circumferential direction of the rotor core 3. Each rotor magnet 5 is supported in a magnet support hole 6 extending through the rotor core 3 in its direction of stacking a plurality of steel sheets. To prevent that the rotor magnets 5 supported in the magnet support holes 6 may project from the rotor core 3, a pair of magnet retainer plates 7 and 8 are provided at the opposite ends of the rotor core 3 in the direction of stacking the steel sheets. Further, a stop ring 9 is mounted on the cylindrical portion 2a of the rotor boss 2 at a position outside of the magnet retainer plate 7 near the front end of the cylindrical portion 2a. A sensor magnet 10 acting on a plurality of rotational angle sensors for the rotor core 3 is mounted on the inner circumferential surface of the cylindrical portion 2a of the rotor boss 2 at its front end. The rotational angle sensors will be hereinafter described. The sensor magnet 10 is composed of a plurality of magnetic poles arranged annularly in such a manner that the adjacent magnetic poles have different polarities.

The other portion of the crankshaft 1 on the engine side except the tapering front end portion 1a is not tapered as a cylindrical portion, and a starter main gear 12 is mounted through a needle bearing 11 to this cylindrical portion of the crankshaft 1. The starter main gear 12 is mounted through a one-way clutch 13 to the flange 2b of the rotor boss 2. The one-way clutch 13 and the flange 2b are fixed together by a plurality of bolts 14.

A shaft 15 is supported at one end thereof to a crankcase (not shown) and at the other end to a generator cover 23. An intermediate gear 16 is rotatably supported to the shaft 15. The starter main gear 12 is in mesh with the small gear 16a of the intermediate gear 16. The large gear 16b of the intermediate gear 16 is in mesh with an output gear of a starter motor (not shown).

A stator core 18 is provided so as to surround the outer circumference of the rotor core 3. The stator core 18 has a split structure consisting of a plurality of stator core blocks 19. In this preferred embodiment, twelve stator core blocks 19 are joined together to constitute the annular stator core 18. An insulating component 20 is fitted to the periphery of the tooth (projecting pole) of each stator core block 19, and a stator winding 21 is accommodated in a recess of the insulating component 20 so as to be wound therearound. In FIG. 2, an insulating component 20 and a stator winding 21 are attached to one of the plural stator core blocks 19 for simplicity of illustration.

Each stator core block 19 is formed with a mounting hole 19a. A bolt 22 is inserted through the mounting hole 19a and is threadedly engaged at the front end thereof with a tapped hole 24 formed on the inner surface of the generator cover 23, thereby fixing each stator core block 19 to the generator cover 23.

A bus ring 25 is provided in a central portion of the stator core 18. The bus ring 25 is positioned to the stator core 18 by engaging the outer circumferential portion of the bus ring 25 with the insulating component 20. A plurality of terminals 26 for connection with the ends of the stator windings 21 are provided on the outer circumferential surface of the bus ring 25. In FIG. 2, terminals 26 are attached to one of the plurality of stator core blocks 19. The bus ring 25 is provided with three grommets 27, 28, and 29 corresponding to the three-phase output from the generator. A bolt for connecting an external output harness is threadedly engaged with each of the grommets 27 to 29. The grommets 27 to 29 and the respective terminals 26 are connected through bus bars embedded in the bus ring 25 (which will be hereinafter described in detail with reference to FIG. 5).

The inner surface of the generator cover 23 is formed with a sensor fixing boss 33. A sensor substrate 34 is mounted to the boss 33 by a bolt 35. Three rotational angle sensors 36, 37, and 38 of Hall elements are provided on the sensor substrate 34 so as to be opposed to the sensor magnet 10. The boss 33 and the sensor substrate 34 are inserted through a hole 39 formed on the bus ring 25.

The bus ring 25 may incorporate a control driver including switching devices (FETs) for controlling the voltages generated in the stator windings 21. Further, the bus ring 25 may incorporate a thermistor for measuring the inside temperature of the generator.

The generator cover 23 is mounted on the outer surface (side surface) of the crankcase of the engine. In this preferred embodiment, the generator cover 23 is formed with a plurality of projecting portions 23a (one of them being shown in FIG. 1). Each projecting portion 23a is formed with a mounting hole 23b. The bolt inserted through the mounting hole 23b of each projecting portion 23a of the generator cover 23 is screwed into a tapped hole formed in the wall of the crankcase (not shown), thus fixing the generator cover 23 to the crankcase.

Figure 3:
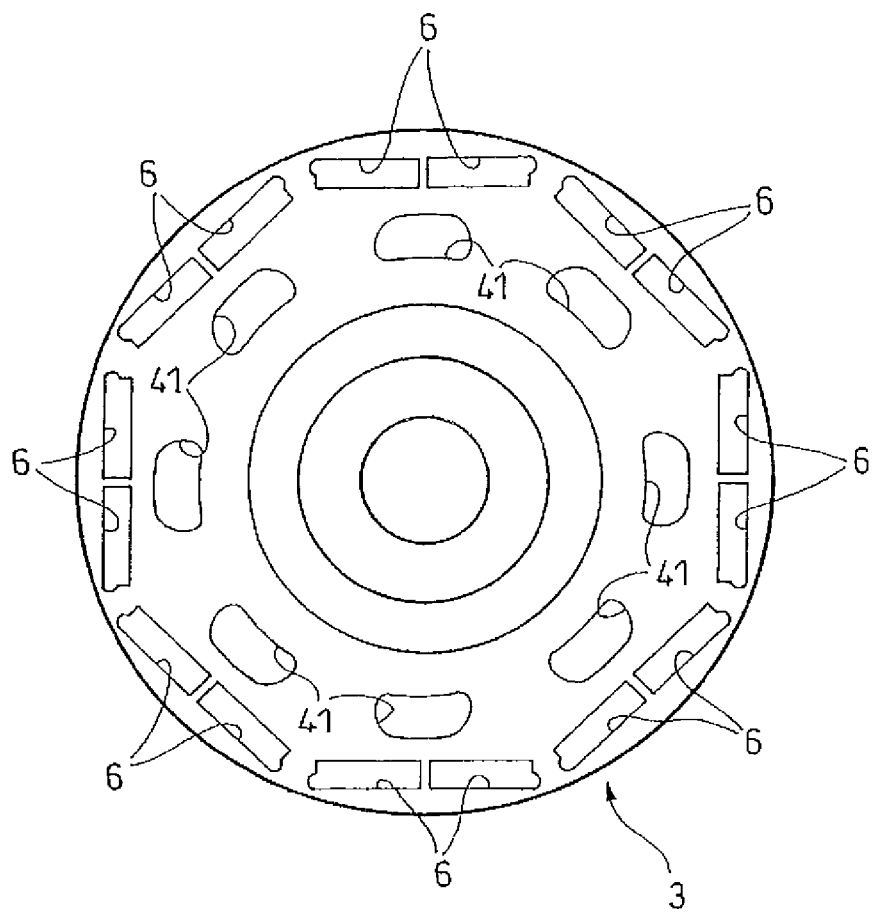
FIG. 3 is an elevational view of a rotor core.

FIG. 3 is an elevational view of the rotor core 3. The rotor core 3 is formed by stacking a plurality of electromagnetic steel sheets. The rotor core 3 is formed with sixteen magnet support holes 6 forming eight pairs for respectively supporting the rotor magnets 5. The rotor core 3 is further formed with eight holes 41 radially inside of these magnet support holes 6, so as to improve a cooling effect and reduce a magnetic resistance.

Figure 4:
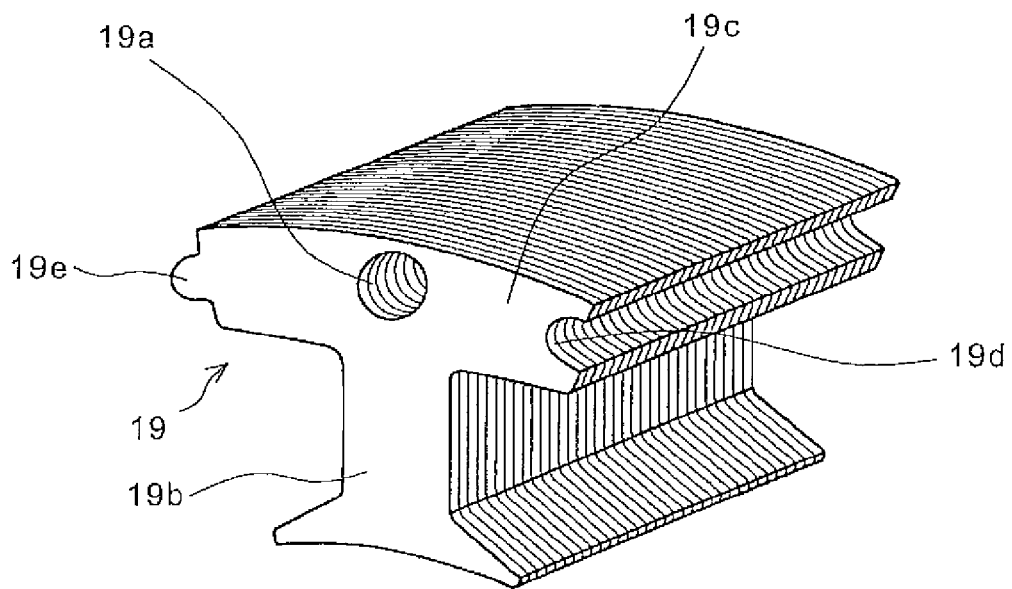
FIG. 4 is a perspective view of a stator core block.

FIG. 4 is a perspective view of each stator core block 19. Each stator core block 19 is also formed by stacking a plurality of electromagnetic steel sheets similar to the stator core 3. Each stator core block 19 is composed of a tooth 19b around which the stator winding 21 is wound through the insulating component 20 and an outer circumferential portion 19c functioning as a connecting portion adapted to be connected to the adjacent stator core blocks 19. A mounting hole 19a is formed at a central portion of the outer circumferential portion 19c. A recess 19d is formed at one end of the outer circumferential portion 19c, and a projection 19e is formed at the other end of the outer circumferential portion 19c. The recess 19d is adapted to engage with a similar projection of one of the adjacent stator core blocks 19, and the projection 19e is adapted to engage with a similar recess of the other adjacent stator core block 19.

Figure 5:
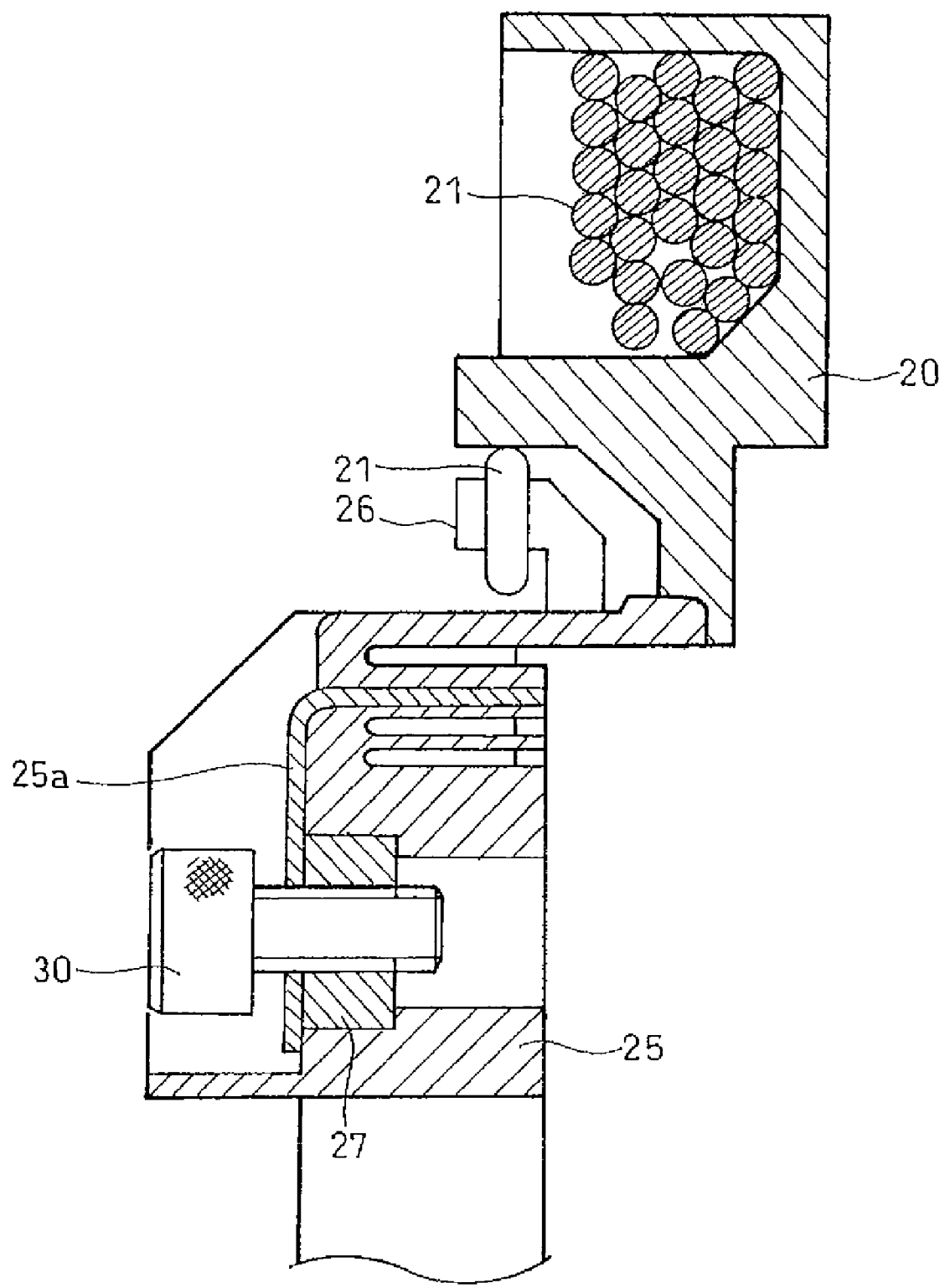
FIG. 5 is an enlarged view showing a main portion between a bus ring and an insulating component of a stator core.

FIG. 5 is an enlarged view showing an engaged portion between the bus ring 25 and the insulating component 20. As shown in FIG. 5, the bus ring 25 is engaged with a step portion of the insulating component 20, and the opposite ends of the stator winding 21 wound around the insulating component 20 are connected to the terminals 26 formed on the outer circumferential surface of the bus ring 25 for each stator core block 19. The terminals 26 are connected to a bus bar 25a, and the bus bar 25a is connected to the grommet 27. A bolt 30 is threadedly engaged with the grommet 27. The bolt 30 is connected to an output harness (not shown). Although not shown, an FET of an output control driver is also connected to the bus bar 25a. The grommet 27 is provided for the connection of the V phase of U, V, and W phases as the three phases. The stator windings 21 assigned to the V phase are connected through the bus bar 25a to the grommet 27. Although not shown, the stator windings 21 assigned to the U and W phases are also connected through similar bus bars to the respective grommets 28 and 29.

In the configuration of the above generator, when it operates, the starter motor is first driven, and a driving force from the starter motor is transmitted through the output gear of the starter motor and the intermediate gear 16 to the starter main gear 12 with a rotational speed being reduced. Accordingly, the starter main gear 12 is rotated, and the rotation thereof is transmitted through the one-way clutch 13 to the rotor boss 2, thereby rotating the crankshaft 1. As the result of rotation of the crankshaft 1, the engine is started by an engine control device (not shown). When the engine speed is increased after starting the engine, the one-way clutch 13 operates to disconnect the starter main gear 12 from the rotor boss 2, and the generator is operated according to the engine speed.

By the rotation of the rotor boss 2, a magnetic flux on each rotor magnet 5 provided in the rotor core 3 is changed to induce an electromotive force in each stator winding 21, thereby generating electric power from each stator winding 21. The electric power thus generated is controlled in voltage by the output control driver and supplied to a load and a battery. The on/off timing of the FETs included in the output control driver is determined by the rotational angle of the rotor core 3 detected according to the waveforms output from the rotational angle sensors 36, 37, and 38.

According to this preferred embodiment, the bus ring 25 is engaged with the stator core 18, and the connection terminals 26 for the stator windings 21 are connected through the bus bars 25a embedded in the bus ring 25 to the grommets 27 to 29 connected to the output harnesses and to the switching devices in the control driver. Thus, the components of an output control system for controlling the output from the stator windings 21 are collectively provided in the bus ring 25, so that the inside space of the generator cover 23 can be effectively used. Further, the generator is of an inner rotor type such that the stator core 18 is provided around the rotor core 3, so that the spacing between the stator core 18 and the generator case 23 can be reduced. As a result, the radial size of the generator case 23 in the radial direction about the rotor core 3 can be reduced.

In this preferred embodiment, the sensor substrate 34 having the rotational angle sensors 36, 37, and 38 is mounted on the generator case 23. However, the mounting structure for the sensor substrate 34 is not limited. For example, the sensor substrate 34 may be mounted on the bus ring 25.

Figure 6:
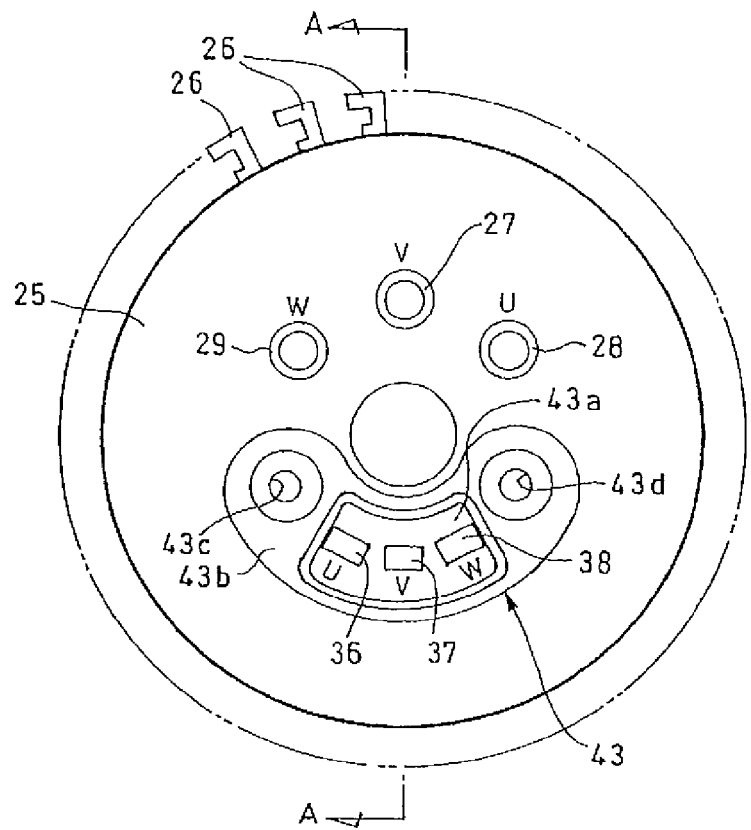
FIG. 6 is an elevational view of a bus ring according to a modification of the preferred embodiment.
Figure 7:
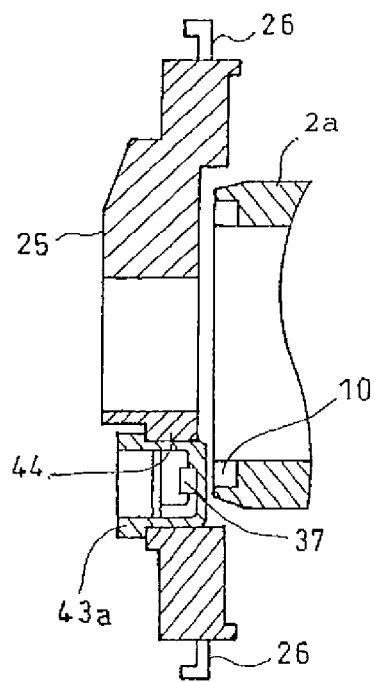
FIG. 7 is a cross section taken along the line A-A in FIG. 6.

FIG. 6 is an elevational view of a bus ring 25 according to a modification of the above preferred embodiment, and FIG. 7 is a cross section taken along the line A-A in FIG. 6. In this modification, a sensor substrate 43 is fixed to the bus ring 25. The sensor substrate 43 is composed of a supporting portion 43a for supporting the rotational angle sensors 36, 37, and 38 and a mounting portion 43b projecting from the opposite ends of the supporting portion 43a. A pair of bolt insertion holes 43c and 43d are formed through the mounting portion 43b near the opposite ends thereof. Although not shown, bolts are inserted through the bolt insertion holes 43c and 43d and are threadedly engaged with tapped holes (not shown) formed in the bus ring 25, thus fixing the sensor substrate 43 to the bus ring 25. The supporting portion 43a is inserted through a sensor location hole 44 formed in the bus ring 25, and the rotational angle sensors 36, 37, and 38 are opposed to the sensor magnet 10 mounted on the front end of the cylindrical portion 2a of the rotor boss 2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A generator for a vehicle having an engine wherein the generator is driven by said engine, comprising:
   a rotor boss engaged with one end of a crankshaft of said engine;
   a rotor core having an inner circumference engaged with the outer circumference of said rotor boss, said rotor core having a plurality of rotor magnets arranged along the outer circumference of said rotor core;
   an annular stator core having an inner circumference opposed to the outer circumference of said rotor core;
   a plurality of insulating components respectively surrounding a plurality of teeth of said stator core;
   a plurality of stator windings respectively wound around said plurality of insulating components;
   a bus ring opposed to one end surface of said rotor core opposite to said engine, said bus ring having an outer circumference engaged with said insulating components;
   a generator cover mounted on a crankcase of said engine;
   a rotational angle sensor for detecting a rotational angle of said rotor boss;
   a sensor magnet provided on one end of said rotor boss so as to be opposed to said rotational angle sensor; and
   a generated voltage control driver mounted on said bus ring;
   said stator core being held to said generator cover.

2. The generator for a vehicle according to claim 1, wherein said rotor core has a plurality of rotor magnet support holes formed in the vicinity of the outer circumference of said rotor core so as to extend in the axial direction of said rotor boss from one end surface to the other end surface of said rotor core, and
   said plurality of rotor magnets are respectively fitted in said plurality of rotor magnet support holes.

3. The generator for a vehicle according to claim 1, wherein said stator core is composed of a plurality of stator core blocks connected together so as to form an annular shape.

4. The generator for a vehicle according to claim 2, wherein said stator core is composed of a plurality of stator core blocks connected together so as to form an annular shape.

5. The generator for a vehicle according to claim 1, wherein said bus ring is a disk-shaped member, and
   said bus ring includes:
      a plurality of terminals formed along the outer circumference of said bus ring for connecting said plurality of stator windings at their opposite ends,
      a grommet for fixing a harness for drawing out a current generated in said stator windings, and
      a bus bar for connecting said terminals to said grommet.

6. The generator for a vehicle according to claim 2, wherein said bus ring is a disk-shaped member, and
   said bus ring includes:
      a plurality of terminals formed along the outer circumference of said bus ring for connecting said plurality of stator windings at their opposite ends,
      a grommet for fixing a harness for drawing out a current generated in said stator windings, and
      a bus bar for connecting said terminals to said grommet.

7. The generator for a vehicle according to claim 3, wherein said bus ring is a disk-shaped member, and
   said bus ring includes:
      a plurality of terminals formed along the outer circumference of said bus ring for connecting said plurality of stator windings at their opposite ends,
      a grommet for fixing a harness for drawing out a current generated in said stator windings, and
      a bus bar for connecting said terminals to said grommet.

8. The generator for a vehicle according to claims 1, wherein a gear is mounted on the other end of said rotor boss opposed to said engine to transmit a driving force from an external starter motor through a one-way clutch to said rotor boss.

9. The generator for a vehicle according to claims 2, wherein a gear is mounted on the other end of said rotor boss opposed to said engine to transmit a driving force from an external starter motor through a one-way clutch to said rotor boss.

10. The generator for a vehicle according to claims 3, wherein a gear is mounted on the other end of said rotor boss opposed to said engine to transmit a driving force from an external starter motor through a one-way clutch to said rotor boss.

11. The generator for a vehicle according to claims 4, wherein a gear is mounted on the other end of said rotor boss opposed to said engine to transmit a driving force from an external starter motor through a one-way clutch to said rotor boss.

12. The generator for a vehicle according to claim 1, wherein said rotational angle sensor is held to said bus ring.

13. The generator for a vehicle according to claim 2, wherein said rotational angle sensor is held to said bus ring.

14. The generator for a vehicle according to claim 3, wherein said rotational angle sensor is held to said bus ring.

15. The generator for a vehicle according to claim 5, wherein said rotational angle sensor is held to said bus ring.

16. The generator for a vehicle according to claim 8, wherein said rotational angle sensor is held to said bus ring.

17. The generator for a vehicle according to claim 1, wherein said rotational angle sensor is mounted on a boss formed on the inner surface of said generator cover, said boss extending through said bus ring to said rotor boss.

18. The generator for a vehicle according to claim 2, wherein said rotational angle sensor is mounted on a boss formed on the inner surface of said generator cover, said boss extending through said bus ring to said rotor boss.

19. The generator for a vehicle according to claim 3, wherein said rotational angle sensor is mounted on a boss formed on the inner surface of said generator cover, said boss extending through said bus ring to said rotor boss.

20. The generator for a vehicle according to claim 5, wherein said rotational angle sensor is mounted on a boss formed on the inner surface of said generator cover, said boss extending through said bus ring to said rotor boss.

* * * * *